United States Patent
Clerici et al.

(10) Patent No.: US 7,098,251 B2
(45) Date of Patent: *Aug. 29, 2006

(54) PROCESS FOR THE PRODUCTION IN CONTINUOUS OF HYDROCARBONS FROM SYNTHESIS GAS, IN SLURRY REACTORS AND FOR THE SEPARATION FROM THE SOLID PHASE OF THE LIQUID PHASE PRODUCED

(75) Inventors: Gabriele Carlo Ettore Clerici, Milan (IT); Giuseppe Belmonte, Turin (IT)

(73) Assignees: ENI S.p.A., Rome (IT); Institut Francais du Petrole, Rueil-Malmaison (FR); Enitecnologie S.p.A., San Donato Milanese (IT)

( * ) Notice: Subject to any disclaimer, the term of this patent is extended or adjusted under 35 U.S.C. 154(b) by 99 days.

This patent is subject to a terminal disclaimer.

(21) Appl. No.: 10/838,250

(22) Filed: May 5, 2004

(65) Prior Publication Data
US 2005/0000861 A1 Jan. 6, 2005

(30) Foreign Application Priority Data
May 15, 2003 (IT) .......................... MI2003A0969

(51) Int. Cl.
*C07C 27/00* (2006.01)
(52) U.S. Cl. .................. 518/705; 518/700; 518/715
(58) Field of Classification Search ................ 518/700, 518/705, 715
See application file for complete search history.

(56) References Cited
U.S. PATENT DOCUMENTS 5,527,473 A 6/1996 Ackerman
5,900,159 A * 5/1999 Engel et al. ................. 210/788
6,156,809 A 12/2000 Clark et al.
6,214,237 B1 * 4/2001 Kustra et al. ............... 210/709

FOREIGN PATENT DOCUMENTS

| DE | 32 45 318 AQ | 6/1984 |
|----|---|---|
| EP | 0 412 785 A1 | 2/1991 |
| FR | 2 683 154 | 5/1993 |
| JP | 8-108020 | 4/1996 |
| JP | 2000-5566 | 1/2000 |
| WO | WO 99/52618 | 10/1999 |
| WO | WO 03/004582 A2 | 1/2003 |
| WO | WO 03/028845 A1 | 4/2003 |

* cited by examiner

Primary Examiner—J. Parsa
(74) *Attorney, Agent, or Firm*—Oblon, Spivak, McClelland, Maier & Neustadt, P.C.

(57) ABSTRACT

Hydrocarbons are prepared, liquid at the reaction temperature, by feeding synthesis gas into three-phase turbulent reactors wherein the solid phase, consisting of the catalyst in particle form, is kept in suspension in the liquid phase by the rising synthesis gas. The reaction product is separated/filtrated in continuous from the catalyst dispersed therein, by means of a separation/filtration unit consisting of several filtration cartridges, each consisting of at least two porous filtering elements, the first having an average pore diameter ranging from 0.5 to 15 μm, whereas the second has an average pore diameter ranging from 0.002 to 0.1 μm.

17 Claims, 4 Drawing Sheets

PROCESS FOR THE PRODUCTION IN CONTINUOUS OF HYDROCARBONS FROM SYNTHESIS GAS, IN SLURRY REACTORS AND FOR THE SEPARATION FROM THE SOLID PHASE OF THE LIQUID PHASE PRODUCED

The present invention relates to a process for the production in continuous of hydrocarbons starting from synthesis gas in slurry reactors and for the separation from the solid phase of the liquid phase produced.

More specifically, the present invention relates to a process for the production in continuous of hydrocarbons starting from gaseous mixtures based on CO and $H_2$, by means of the Fischer-Tropsch technology in slurry reactors, and for the separation of the hydrocarbon phase, liquid at the reaction temperature, from the solid phase dispersed therein.

Even more specifically, the present invention also relates to the filtering device used in the separation of the suspension.

BACKGROUND OF THE INVENTION

The Fischer-Tropsch technology is known in scientific literature for preparing hydrocarbons from gas mixtures based on hydrogen and carbon monoxide, conventionally known as synthesis gas. A compendium which summarizes the main works on the Fischer-Tropsch synthesis reaction is contained in Bureau of Mines Bulletin, 544 (1955) entitled "Bibliography of the Fischer-Tropsch Synthesis and Related Processes" H. C. Anderson, J. L. Wiley and A. Newell.

In general, the Fischer-Tropsch technology is based on slurry reactors, which are normally used in relation to chemical reactions which take place in three-phase systems, wherein a gaseous phase is bubbled into a suspension of a solid in a liquid. The gaseous phase consists of the synthesis gas with a molar ratio $H_2/CO$ varying from 1 to 3, the dispersing liquid phase, at high temperature, represents the reaction product, i.e. linear hydrocarbons mainly with a high number of carbon atoms, and the solid phase consists of the catalyst.

The reaction product which is discharged from the reactor therefore consists of a suspension containing particle, which are also fine, that must be treated to separate the solid (catalyst) from the liquid phase. Whereas the catalyst is recycled to the synthesis reactor, the liquid is subjected to subsequent upgrading treatment, for example hydrocracking and/or of hydro-isomerization, to obtain hydrocarbon fractions of industrial interest.

European patent 609,079 describes a reactor for Fischer-Tropsch reactions consisting of a gas bubble tower containing a suspension made up of catalyst particles suspended in the liquid hydrocarbon. The synthesis gas is fed to the bottom of the reactor, whereas the synthesized hydrocarbon is recovered at the head.

In order to avoid the entrainment of catalyst particles, the reactor is equipped with cylindrical filtration devices internally arranged in the upper part.

International patent application WO 97/31693 describes a method for separating a liquid from a suspension of solid particles which comprises, in a first phase, degasifying the suspension and, in a second phase, filtering the suspension through a tangential flow. In particular, the suspension comes from a Fischer-Tropsch reactor and consists of synthesized heavy hydrocarbons which entrain the catalyst particles.

Other examples of methods for separating the catalyst contained in the suspension leaving a Fischer-Tropsch reactor are described in European patent 592,176, international patent application WO 94/16807, English patent 2,281,224, U.S. Pat. Nos. 4,605,678 and 5,324,335 and German patent 3,245,318.

A disadvantage associated with Fischer-Tropsch processes, for example with those mentioned above, and in particular Fischer-Tropsch processes in which the catalyst is based on cobalt, is that a hydrocarbon mixture is produced, which, in the subsequent transformation phases (hydro-isomerization and/or hydrocracking), causes an alteration in the performances of the corresponding catalysts.

SUMMARY OF THE INVENTION

The Applicants have surprisingly found a Fischer-Tropsch process for the continuous production of hydrocarbons, using slurry reactors, which allows a reaction product to be obtained, consisting of paraffinic waxes which can then be processed in subsequent upgrading treatment, such as hydro-isomerization and/or hydrocracking processes, without coming up against the drawbacks of the known art, i.e. without causing an alternation in the performances of the corresponding catalyst.

DETAILED DESCRIPTION OF THE INVENTION

An object of the present invention therefore relates to a process for the continuous production of hydrocarbons from synthesis gas in slurry reactors, which comprises:

a. continuously feeding to the bottom of a reactor for Fischer-Tropsch reactions, containing in suspension in the reaction product a catalyst based on supported cobalt, a synthesis gas consisting essentially of hydrogen and carbon monoxide in molar ratios $H_2/CO$ ranging from 1 to 3;

b. continuously discharging from the head of the reactor, a stream consisting essentially, of light synthesis products in vapour phase and non-reacted reaction gas;

c. continuously discharging from the reactor, the heavy reaction product consisting essentially of a liquid hydrocarbon phase;

d. subjecting the heavy reaction product, before or after being discharged, to a separation/filtration treatment using a device which consists of a series of filtration cartridges, each consisting of a first filtering element, for example cylindrical, made of a porous or meshed material with an average size of the pores or meshes ranging from 0.5 to 15 μm, which is positioned above a second filtering element, preferably cylindrical, suitable for micro/ultra-filtration, made of a porous material with an average pore size ranging from 0.002 to 0.1 μm, said second filtering element being inserted in a metallic structure coaxially connected to the first filtering element;

e. sending the heavy reaction product coming from step (d), in liquid phase, having a content of fine or sub-micronic particles lower than 5 ppm to a subsequent treatment unit, for example hydrocracking and/or hydro-isomerization, or discharging it and cooling it to room temperature;

f. recycling the solids coming from the separation/filtration step to the reaction reactor.

According to the process, object of the present invention, the reactor for Fischer-Tropsch reactions is a bubble reactor consisting of a vessel, generally vertical, for example a tower, inside which chemical reactions are triggered, which take place in three-phase systems in which a gaseous/vapour phase is bubbled into a suspension of a solid in a liquid. In the present case, the gaseous/vapour phase consists essentially of the synthesis gas and light reaction products in vapour phase, the dispersing liquid phase is the heavy reaction product or linear hydrocarbons, essentially with a high number of carbon atoms, and the solid phase is represented by the catalyst.

The synthesis gas preferably comes from the steam reforming and/or partial oxidation of natural gas or other hydrocarbons, on the basis of the reactions described, for example, in U.S. Pat. No. 5,645,613. Alternatively, the synthesis gas can come from other production techniques such as, for example, autothermal reforming, C.P.O. (Catalytic Partial Oxidation) or the gasification of carbon with high temperature water vapour as described in "Catalysis Science and Technology", Vol. 1, Springer-Verlag, New York, 1981.

Two phases are substantially produced from the Fischer-Tropsch reaction, a lighter phase, in vapour phase, consisting essentially of a mixture of light hydrocarbons, with from 1 to 25 carbon atoms and a boiling point at atmospheric pressure, for the $C_5$–$C_{25}$ fraction, equal to or lower than about 150° C. and reaction by-products, such as water vapour, ethers or alcohols.

This stream, together with the non-reacted reaction gas, is cooled in order to condense and separate the light hydrocarbons from the water generated by the reaction and from the other by-products. At least part of these liquid hydrocarbon products, consisting essentially of mixtures of $C_5$–$C_{25}$ hydrocarbons, is accumulated in a collection tank maintained at a pressure higher than that present in the synthesis reactor and at a temperature higher than 150° C. This product can be used within the production cycle as process liquid, for example to wash the cartridges at the end of the filtration cycle, or it can be partially discharged and used as diluent in the subsequent hydro-isomerization and/or hydrocracking operations.

The second phase produced consists essentially of paraffinic waxes, liquid at the reaction temperature, comprising mixtures of saturated linear hydrocarbons, with a high number of carbon atoms. These are generally hydrocarbon mixtures which have a boiling point, at room pressure, higher than 150° C., for example from 160 to 380° C.

The Fischer-Tropsch reaction is carried out at temperatures equal to or higher than 150° C., for example ranging from 200 to 350° C., maintaining a pressure ranging from 0.5 to 20 MPa, inside the reactor. More significant details on Fischer-Tropsch reactions are available in "Catalysis Science and Technology" mentioned above.

The heavier liquid phase contains the catalyst in suspension. Any catalyst based on cobalt capable of being active in the Fischer-Tropsch reaction can be used in the process, object of the present invention. The preferred catalyst, according to the present invention, is based on Co dispersed on a solid carrier consisting of at least one oxide selected from one or more of the following elements: Si, Ti, Al, Zr, Mg. Preferred carriers are silica, alumina or titania.

The cobalt is present in the catalyst in quantities ranging from 1 to 50% by weight, generally from 5 to 35%, with respect to the total weight.

The catalyst used in the process, object of the present invention, can comprise other additional elements. For example, it can comprise, with respect to the total, from 0.05 to 5% by weight, preferably from 0.1 to 3%, of ruthenium and from 0.05 to 5% by weight, preferably from 0.1 to 3%, of at least a third element selected from those belonging to group 3 (IUPAC regulation). Catalysts of this type are known in literature and described, together with their preparation, in European patent 756,895.

Further examples of catalysts are still based on cobalt but containing, as promoting element, tantalum in quantities of 0.05–5% by weight, with respect to the total, preferably 0.1–3%. These catalysts are prepared by first depositing a cobalt salt on the inert carrier (silica or alumina), for example by means of the dry impregnation technique, followed by a calcination step and, optionally, a reduction and passivation step of the calcined product.

A derivative of tantalum (particularly tantalum alcoholates) is deposited on the catalytic precursor thus obtained, preferably with the wet impregnation technique followed by calcination and, optionally, reduction and passivation.

The catalyst, whatever its chemical composition may be, is used in finely subdivided powder form with an average diameter of the granules ranging from 10 to 700 μm.

The suspension discharged from the reactor is sent to a separation/filtration unit of the solid from the liquid which can also comprise a degasification apparatus. More specifically, the filtration cartridges, which form the separation/filtration unit, can be inserted inside the synthesis reactor, for example in correspondence with the side outlet, or outside the reactor. In this second case, the separation/filtration unit can also comprise a degasification apparatus outside the reactor.

The possible degasification apparatus essentially comprises a vertical vessel in which the suspension remains for a time ranging from 1 to 5 minutes, during which entrained gas and vapours are released above the free surface of the suspension.

At the end of the optional degasification phase, the suspension is filtered through filtration cartridges. These cartridges consist of a first filtering element, substantially cylindrical, hollow inside, whose surface can be porous or, for example, with fine meshes, or it can obtained by spiral winding a cable with a conical-truncated section or from a sheet on which micro-perforations have been applied. Details on these filters can be found in U.S. Pat. No. 5,844,006.

A residue, concentrated in solids, is obtained from the primary filtration, effected for example with Pall, Johnson, Fuji, Mott systems, which is recycled to the synthesis reactor, together with a filtrated liquid which passes to the secondary filtration or micro/ultrafiltration. The secondary filter is situated below the primary filter and consists of an element, preferably cylindrical, suitable for micro/ultrafiltration inserted in a metallic cylinder so as to form an annular space in which the liquid to be treated flows. Also in this case, a residue, rich in fine or sub-micronic particles, is produced, which can be totally recycled to the reactor or partially discharged, together with a filtrated liquid according to specification. The filtrated fluid which is collected inside the second filtering cylinder can be discharged through a specific channel. For a specific micro/ultrafiltration, for example at a temperature ranging from 210 to 240° C. and at a pressure ranging from 5 to 30 bar, cylindrical filtering elements can be used, made of sintered steel or ceramic materials with multiple channels, for example alumina or zirconia or titania, available on the market such as Membralox® or Schumasiv® produced by Pall Corporation. Information on micro/ultra-filtration is available in W. S. Winston Ho, K. K. Sirkar "Membrane Handbook", Chapman & Hall, 28, 408, 1992 and D. Paulson, "Membranes, he Finest Filtration", Filtration News, 1995.

Downstream of the separation/filtration step, the hydrocarbon liquid phase, substantially free of solid particles which can negatively influence the subsequent transformation phases, can, after possible degassing, be cooled to room temperature and stored in solid phase, or it can be sent to a transformation unit (hydrocracking and/or hydro-isomerization).

At the end of their filtration cycle, the separation/filtration units can be periodically washed in countercurrent with a stream of light synthesis hydrocarbons removed from the corresponding collection tank.

The process for the continuous production of hydrocarbons from synthesis gas, object of the present invention, can be better understood by referring to the drawings of the enclosed figures which represent illustrative but non-limiting embodiments and wherein:

Figure 1:
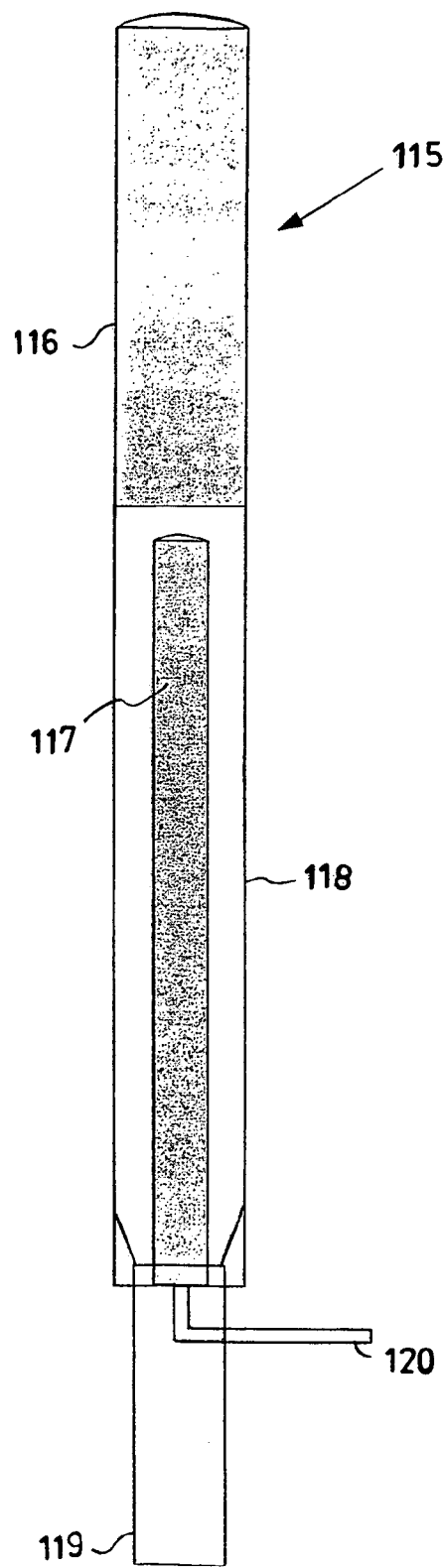
FIG. 1 represents a front view of a filtration cartridge;.
Figure 2:
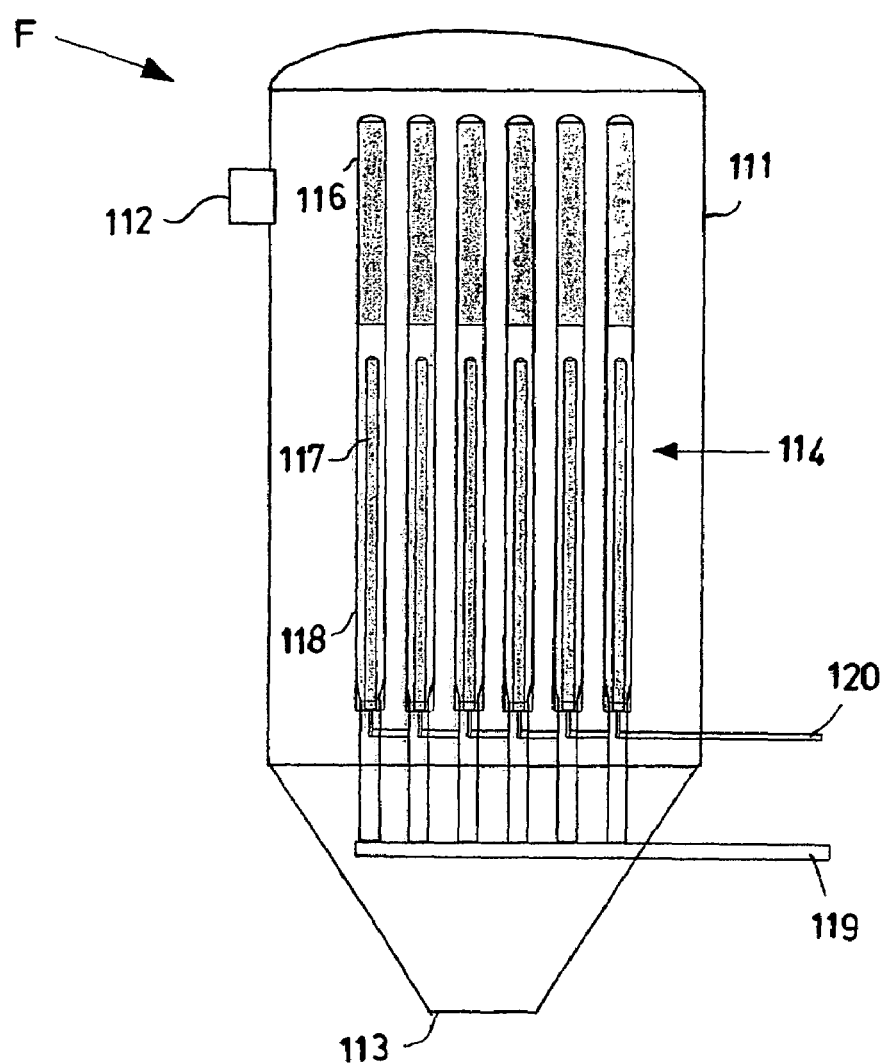
FIG. 2 represents a front view of the filtration device comprising the series of filtration cartridges.

With reference to the figures, the filtration device F used in the process, object of the present invention, comprises a container (111) equipped with an inlet (112) of the suspension and primary outlet (113) of the concentrated suspension. The container (111) is necessary in the case of filtration/separation outside the reaction vessel whereas it can be omitted in the case of internal filtration/separation. A series of filtering cartridges (114) is inserted inside the container, each (115) consisting of a first cylindrical filtering element (116) overlying a second filtering element (117) for micro/ultra-filtration. The second filtering element is inserted in the metallic cylinder (118), and is integrant and coaxial to the first filtering element.

The volume enclosed between the primary filtering element, substantially consisting of a filter (116) and cylinder (118), and the second filtering element (117), is connected to the outlet of the liquid concentrated in fine or sub-micronic particles (119). The secondary filtering element is connected to the outlet of the filtered liquid according to specification (120).

The filtration/separation of the suspension coming from the synthesis reactor appears evident from the enclosed drawings and previous description. The liquid containing solid particles in suspension enters the container (111), containing the cartridges (115), and fills it. The liquid flows through the meshes/pores of the primary filtering element (116) producing a first filtrate and a first concentrated product which is recycled to the synthesis reactor through the outlet (113). The first filtration liquid is collected in the metallic cylinder (118), passes through the second filtering element (117) and, according to specification, can be collected in a collection vessel, by means of the outlet (120), and sent for subsequent treatment. The liquid rich in fine or sub-micronic particles is removed by means of the outlet (119).

The passage of the suspension through the filtering elements can be effected by applying a pressure difference through the filters and panels of solid particles which are formed on the walls. This pressure difference is preferably equal to or lower than 0.5 MPa, generally from 0.1 to 0.4 MPa. When the pressure drop due to the growth of the filtrate panel becomes too high, the filters can be washed by means of a back-flushing with a process liquid, for example the light hydrocarbon liquid which is obtained on condensing the vapours discharged at the head of the synthesis reactor.

The process scheme which uses the filtering device of the present invention outside the reaction vessel (FIG. 3) comprises a reactor R1 to which the synthesis gas is fed through line (1). Inside the reactor, there is a suspension (2) consisting of the catalyst dispersed in the reaction liquid maintained in a state of stirring by the bubbles of synthesis gas which, on rising upwards, meet the particles of catalyst, keep them in suspension and react. The operating conditions of the reactor can be those described, for example, in international patent application WO 03/2246 or French patent 2,826,294.

Figure 3:
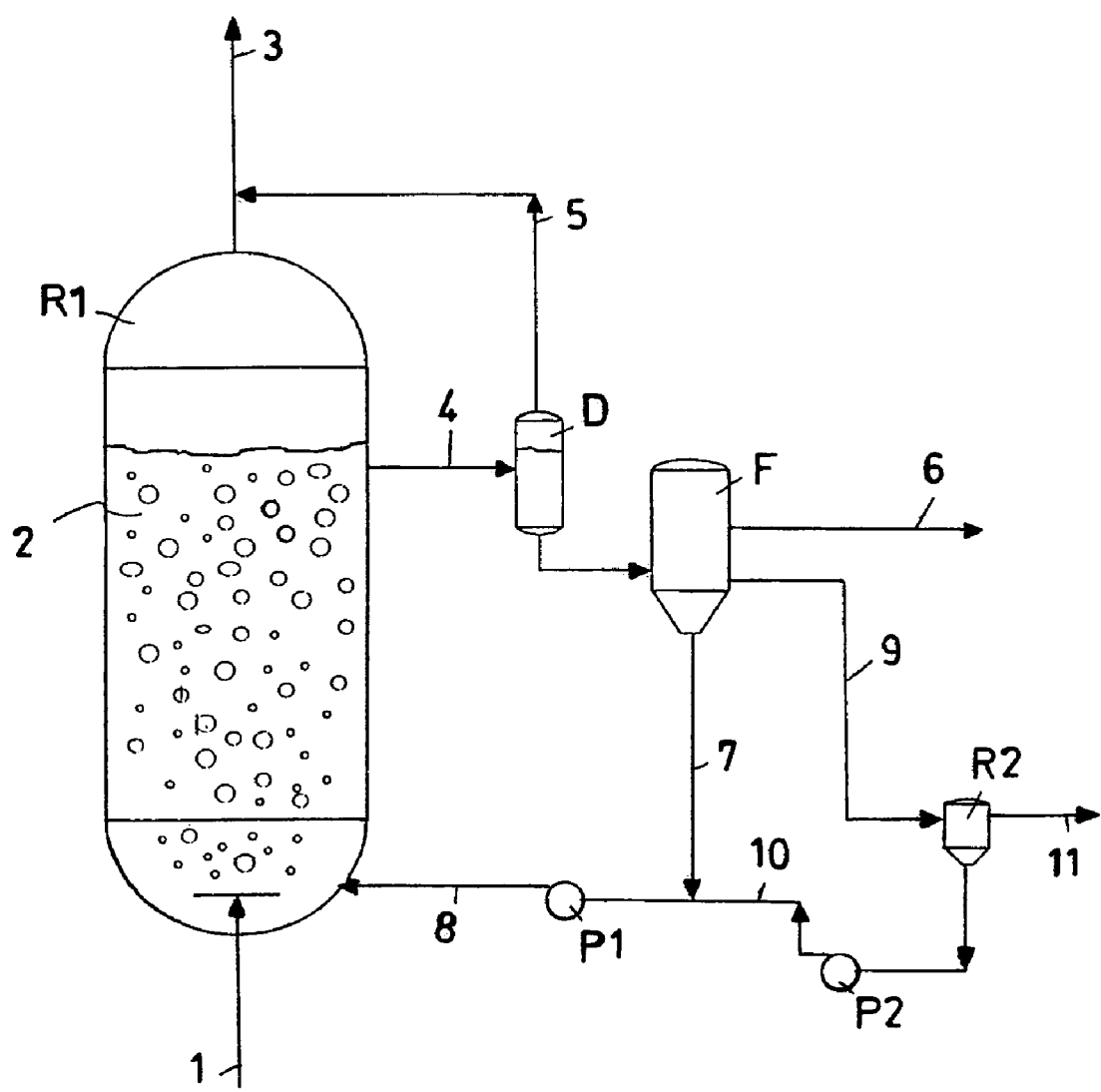
FIG. 3 represents a process scheme in which the filtration device of FIG. 2 is situated outside the reactor.
Figure 4:
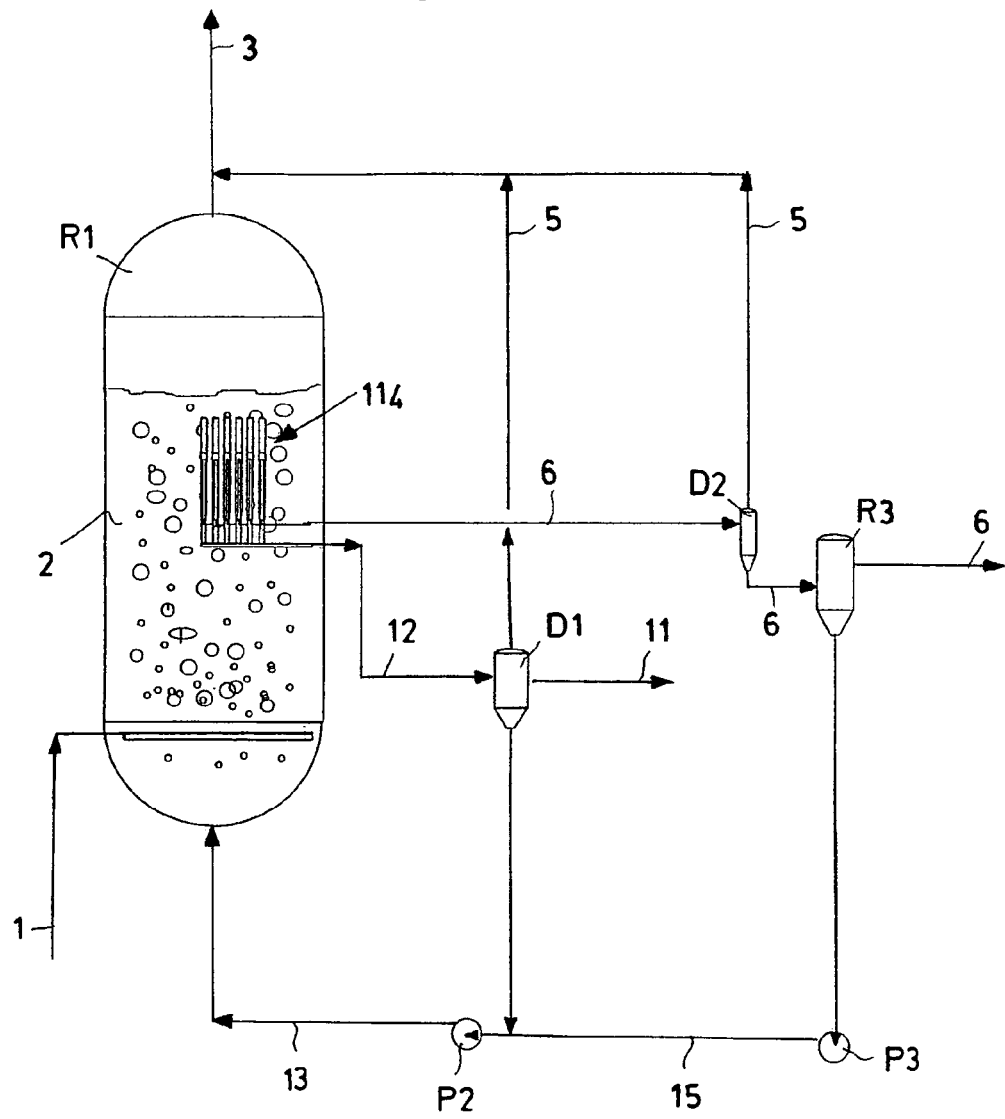
FIG. 4 represents a process scheme in which the filtration cartridges of FIG. 1 are situated inside the reactor.

A gaseous stream essentially consisting of the non-reacted gas and light reaction products and by-products, is discharged from the head of the reactor, through line (3), which is fed to a cooling and condensation section of a light hydrocarbon fraction not illustrated in the schemes of FIGS. 3–4. The hydrocarbon suspension, the liquid product of the Fischer-Tropsch reaction, is discharged through line (4) and sent to the degasifier D where the entrained gases and vapours are released, above the free surface of the suspension, and are sent through line (5) to the cooling and condensation section, not illustrated.

The suspension is then sent to the filtration device F from which the filtrated stream according to specification (6) the retentate of the primary filtration (7), recycled to the reactor R1 by means of the pump P1 and line (8) or by means of a natural external circulation, and the retentate of the secondary filtration (9), recycled to the reactor R1 by means of the pump P2 and line (10), are respectively recovered In order to limit the possible accumulation of fine sub-micronic particles in the reactor R1, it is possible to discharge part of the stream concentrated in fine or sub-micronic particles (9) by inserting a collection container R2 from which a purge (11) is effected.

If the filtration device of the present invention is situated inside the reaction vessel (FIG. 4), the filtration cartridges can be simply arranged inside the suspension (2). With respect to the process scheme with external filtration/separation, the scheme of FIG. 4 comprises a collection vessel R3 which recycles the filtrated liquid to the reactor, through (15) and pumps P2 and P3, should it have, as a result of a possible breakage of one or more cartridges, a concentration of fine particles higher than specification. In addition, the retentate of the secondary filtration and the filtrate are sent through lines (12) and (6) respectively, to the degasifiers D1 and D2 where the gas released is sent to the condensation section, not shown in the figures. The degassed suspension in D1 is then recycled to the reactor R1 by means of the pump P2 and line (13).

A purge through line (11) is again contemplated, in order to limit the possible accumulation of fine particles in the system.

The invention claimed is:

1. A process for the production in continuous of hydrocarbons from synthesis gas in slurry reactors which comprises:
   a. continuously feeding to the bottom of-a reactor for Fischer-Tropsch reactions, containing in suspension in the reaction product, a catalyst based on supported cobalt, a synthesis gas consisting essentially of hydrogen and carbon monoxide;
   b. continuously discharging from the head of the reactor, a stream consisting essentially of light synthesis products in vapour phase and non-reacted reaction gas;

c. continuously discharging from the reactor, the heavy reaction product consisting essentially of a liquid hydrocarbon phase;

d. subjecting the heavy reaction product, before or after being discharged, to a separation/filtration treatment using a device which comprises a series of filtration cartridges, each consisting of a first filtering element made of a porous or meshed material with an average size of the pores or meshes ranging from 0.5 to 15 μm, which is positioned above a second filtering element, suitable for micro/ultra-filtration, made of a porous material with an average pore size ranging from 0.002 to 0.1 μm, said second filtering element being inserted in a metallic structure coaxially connected to the first filtering element;

e. sending the heavy reaction product coming from step (d), in liquid phase, having a content of fine or submicronic particles lower than 5 ppm to a subsequent treatment unit, or discharging it and cooling it to room temperature;

f. recycling the solids coming from the separation/filtration step to the reaction reactor.

2. The process according to claim 1, wherein the reactor for reactions of the Fischer-Tropsch type is a bubble reactor consisting of a vessel inside which chemical reactions are triggered, which take place in three-phase systems where a gaseous/vapour phase is bubbled into a suspension of a solid in a liquid.

3. The process according to claim 1 or 2, wherein the gaseous/vapour phase consists essentially of the synthesis gas and light reaction products in vapour phase, the dispersing liquid phase is the heavy reaction product or linear hydrocarbons, essentially with a high number of carbon atoms, and the solid phase is represented by the catalyst.

4. The process according to claim 1, wherein the light reaction products consist essentially of hydrocarbon mixtures with a number of carbon atoms ranging from 1 to 25 and a boiling point, for the $C_5$–$C_{25}$ fraction, equal to or lower than about 150° C.

5. The process according to claim 1, wherein the heavy reaction product consists essentially of paraffinic waxes, liquid at the reaction temperature, comprising mixtures of saturated, linear hydrocarbons, with a high number of carbon atoms having a boiling point, at atmospheric pressure, higher than 150° C.

6. The process according to claim 1, wherein the Fischer-Tropsch reaction is carried out at temperatures equal to or higher than 150° C., a pressure ranging from 0.5 to 20 MPa being maintained inside the reactor.

7. The process according to claim 1, wherein the catalyst is based on cobalt dispersed on a solid carrier selected from at least one oxide of one or more of the following elements: Si, Ti, Al, Zr, Mg.

8. The process according to claim 7, wherein the cobalt is present in quantities ranging from 1 to 50% by weight with respect to the total weight.

9. The process according to claim 7 or 8, wherein the catalyst comprises, with respect to the total, from 0.05 to 5% by weight of ruthenium and from 0.05 to 5% by weight of at least a third element selected from those belonging to group 3.

10. The process according to claim 7 or 8, wherein the catalyst comprises, as promoting element, tantalum in quantities ranging from 0.05–5% by weight, with respect to the total.

11. The process according to claim 1, wherein the catalyst is used in the form of a finely subdivided powder with an average diameter of the granules ranging from 10 to 700 μm.

12. The process according to claim 1, wherein the separation/filtration treatment takes place by means of filtration cartridges situated inside or outside the synthesis reactor.

13. The process according to claim 12, wherein the filtration cartridges are situated outside the synthesis reactor.

14. The process according to claim 1, wherein the separation/filtration unit comprises at least one degasification apparatus.

15. The process according to claim 14, wherein the degasification apparatus essentially consists of a vertical vessel in which the suspension remains for a time ranging from 1 to 5 minutes.

16. The process according to claim 12, wherein the filtration device is situated inside the synthesis reactor.

17. The process according to claim 1, wherein, at the end of their filtering cycle, the separation/filtration units are periodically washed in countercurrent with a stream of light synthesis hydrocarbons.

* * * * *